US011385387B2

(12) United States Patent
Yokoyama

(10) Patent No.: US 11,385,387 B2
(45) Date of Patent: Jul. 12, 2022

(54) DIFFRACTIVE OPTICAL ELEMENT AND METHOD OF PRODUCING SAME

(71) Applicant: CANON KABUSHIKI KAISHA, Tokyo (JP)

(72) Inventor: Satoshi Yokoyama, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 16/683,907

(22) Filed: Nov. 14, 2019

(65) Prior Publication Data
US 2020/0158927 A1 May 21, 2020

(30) Foreign Application Priority Data
Nov. 21, 2018 (JP) .............................. JP2018-218194

(51) Int. Cl.
*G02B 5/18* (2006.01)
*G02B 5/20* (2006.01)

(52) U.S. Cl.
CPC ............... *G02B 5/18* (2013.01); *G02B 5/203* (2013.01)

(58) Field of Classification Search
CPC .......... G02B 5/18; G02B 5/203; G02B 5/1871
See application file for complete search history.

(56) References Cited

U.S. PATENT DOCUMENTS

2015/0090862 A1* 4/2015 Matsui ................. G02B 5/1809
250/208.1
2016/0306079 A1* 10/2016 Arbabi ............... G02B 27/0025

FOREIGN PATENT DOCUMENTS

| JP | 2001-318217 A | 11/2001 |
| JP | 2008-014993 A | 1/2008 |
| JP | 2012-173555 A | 9/2012 |

* cited by examiner

*Primary Examiner* — Robert E. Tallman
(74) *Attorney, Agent, or Firm* — Venable LLP

(57) ABSTRACT

A diffractive optical element having, on a surface of a transparent substrate, a plurality of types of regions which provide different phase modulation to an incident light, wherein each of the regions has a microstructure formed with concave and convex portions of which sizes are smaller than the wavelength of the incident light, and wherein in the microstructure, a ratio of the width of the convex portion and the width of the concave portion in the concave and convex portions and the depth of the concave portion are different for each type of region.

19 Claims, 6 Drawing Sheets

FIG. 1A  PRESENT METHOD
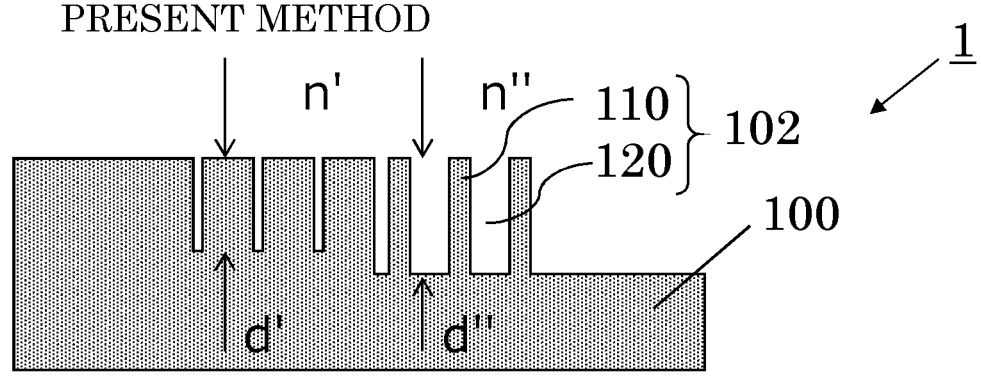
FIG. 1B  CONVENTIONAL METHOD
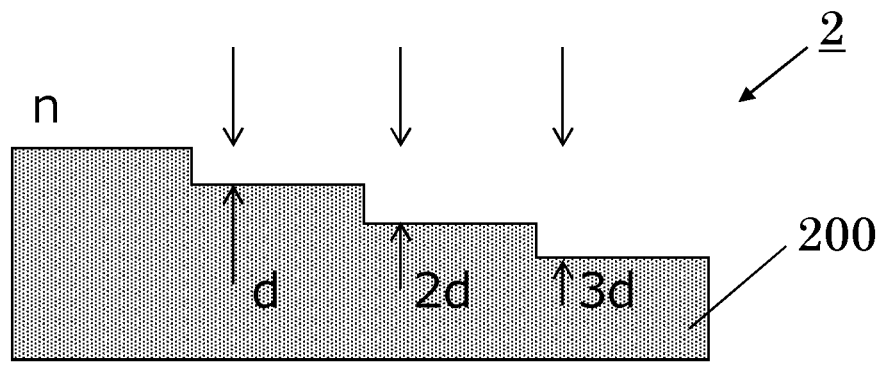

DIFFRACTIVE OPTICAL ELEMENT AND METHOD OF PRODUCING SAME

BACKGROUND OF THE INVENTION

Field of the Invention

The present invention relates to a diffractive optical element and a method of producing the diffractive optical element.

Description of the Related Art

A phase modulation type diffractive optical element is used for branching a laser beam or changing the shape of a laser profile, and thus must have a form capable of providing different phase modulation for each region in the element to the incident light. In such a phase modulation type diffractive optical element, an engraving amount of the substrate is normally different depending on the position, for example, the engraving amount is large in a position where the phase modulation is large, and the engraving amount is small in a position where the phase modulation is small.

In order to continuously change the phase modulation amount of the phase modulation type diffractive optical element, the surface must be curved and the engraving amount of the element continuously change. However it is difficult to form a continuous curved surface, therefore the curved surface that is approximated to a discontinuous stepped form is often produced. It is relatively easy to produce this stepped form using a lithographic technique, which is a common semiconductor production process technique. But in order to improve diffraction efficiency, a number of steps of the step shape must be increased so that the accuracy of the approximation to an inclined plane is increased. If a number of steps increases, a number of times of the process increases too, which makes production difficult.

Japanese Patent Application Publication No. 2012-173555 discloses an optical element where a phase modulation function, equivalent to a step type diffraction grating, is provided by forming an uneven surface of which pitch is less than the wavelength of the incident light, and changing an effective refractive index, which is determined by a pitch or by a fill factor (ratio of width of a convex portion and a width of a concave portion) of the structure, for each location. With this method, however, it is necessary to form a structure of which fill factor is extremely large, or a structure of which fill factor is extremely small, to modulate the refractive index, and this makes stable production difficult.

In Japanese Patent Application Publication No. 2001-318217, an effective refractive index is modulated by adjusting the fill factor of the pillar or hole shapes, which are formed in a cycle that is not more than the wavelength of the incident light, and this structure is processed to have a predetermined depth, whereby a diffractive optical element having the phase modulation function is formed. In the case of this method, however, the fill factor of a structure that can be actually formed is limited, hence it is difficult to set a large modulation amount of the refractive index. If the modulation amount of the refractive index is small, the depth of the structure must be increased to implement a desired phase modulation amount, and this makes it difficult to form the structure.

SUMMARY OF THE INVENTION

With the foregoing in view, it is an object of the present invention to provide a phase modulation type diffractive optical element that can be easily produced, and a method of producing the diffractive optical element.

The first aspect of the present disclosure is a diffractive optical element having, on a surface of a transparent substrate, a plurality of types of regions which provide different phase modulation to an incident light, wherein each of the regions has a microstructure formed with concave and convex portions of which sizes are smaller than the wavelength of the incident light, and wherein in the microstructure, a ratio of the width of the convex portion and the width of the concave portion in the concave and convex portions and the depth of the concave portion are different for each type of region.

The second aspect of the present disclosure is a method of producing a diffractive optical element, comprising: a step of forming resist patterns having different cycles on a surface of a transparent substrate; and a step of forming a microstructure formed with concave and convex portions by performing dry etching using the resist patterns as a mask, wherein in the step of forming the microstructure, a microstructure in which depth of the concave portion is in accordance with the ratio of the width of the convex portion and the width of the concave portion in the concave and convex portions is formed by changing the etching rate in accordance with the interval of the resist patterns.

The third aspect of the present disclosure is a method of producing a diffractive optical element, comprising: a step of forming resist patterns having different cycles on a surface of a transparent substrate; and a step of forming a microstructure formed with concave and convex portions by performing dry etching using the resist patterns as a mask, wherein in the step of forming a microstructure, a microstructure in which depth of the concave portion is in accordance with the ratio of the width of the convex portion and the concave portion in the concave and convex portions is formed by performing dry etching under the etching conditions for etching the transparent substrate in tapered shapes.

According to the present invention, a diffractive optical element can be easily produced.

Further features of the present invention will become apparent from the following description of exemplary embodiments with reference to the attached drawings.

BRIEF DESCRIPTION OF THE DRAWINGS

FIG. 1A and FIG. 1B are cross-sectional view of diffractive optical elements according to this embodiment and a conventional method;

DESCRIPTION OF THE EMBODIMENTS

Figure 2A:
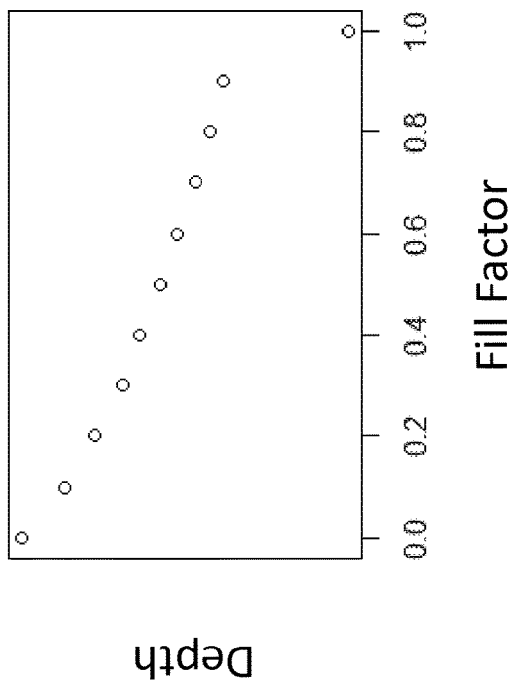
FIG. 2A to FIG. 2C are graphs depicting the relationship between the fill factor and the effective refractive index, the depth and the phase modulation amount.

A diffractive optical element (DOE) according to the present invention has a structure of which cycle is not more than the wavelength of the incident light, and the phase modulation amount of each region of the element is determined by the fill factor and the depth of the structure, which are different depending on the structure. The structure to implement the optical element and a method of forming this structure will be described below in detail.

Determination of Structure

FIG. 1A illustrates a cross-sectional structure of a phase modulation type diffractive optical element 1 according to this technique (hereafter called "diffractive optical element 1" or "optical element 1"), and FIG. 1B illustrates a cross-sectional structure of a conventional step type optical element 2. The phase modulation type diffractive optical element according to this technique will be described in comparison with the conventional step type optical element.

The conventional step type optical element 2 will be described first with reference to FIG. 1B. When n is the refractive index of the substrate 200, and d is the depth of each step, the phase modulation amount φ1 of the first step is given by the following expression:

$$\varphi 2=(n-1)\times d.$$

In the same manner, the phase modulation amount φ2 for the second step is given by the following expression:

$$\varphi 2=(n-1)\times 2d.$$

and the phase modulation amount φm for the m-th step (m=1, 2, 3, . . . ) is given by the following expression:

$$\varphi m=(n-1)\times d\times m.$$

The optical element 1 according to this technique will be described with reference to FIG. 1A. In the optical element 1, a structure 102 having a cycle that is smaller than the wavelength λ of the incident light is formed on the surface of the substrate 100. The structure 102 is a microstructure formed with concave/convex portions, each of which size is smaller than the wavelength λ, where the convex portion 110 and the concave portion 120 are repeated. The concave/convex portions of the structure 102 may have a cyclic structure where the concave/convex portions are repeated at a predetermined cycle that is not more than the wavelength λ of the incident light, or have a non-cyclic structure where the concave/convex portions are formed at irregular cycles of which average cycle is not more than the wavelength λ.

The structure 102 may be a structure where a pillar-shaped (column-shaped) convex portion 110 is repeated two-dimensionally, or may be a structure where a hole-shaped (pit hole-shaped) concave portion 120 is repeated two-dimensionally, or may be a combination thereof. The structure 102 may also be a structure where a convex strip-shaped convex portion 110 is repeated. In the following description, it is assumed that the structure 102 is a structure where a pillar-shaped convex portion 110 is repeated two-dimensionally.

The optical element 1 includes a plurality of types of regions in accordance with the phase modulation amount provided to the incident light. The fill factor and the height (height of the convex portion 110, depth of the concave portion 120) of the structure 102 in each region are different for each type of the region (phase modulation amount).

An effective refractive index n' of the structure 102 changes depending on the pitch and the fill factor of the structure 102, and is a value in the range of 1<n'<n. The fill factor may be defined by the ratio of the width of the convex portion 110 and the width of the concave portion 120 in the concave and convex portions of the structure 102, or may be defined by the ratio of the width of the convex portion 110 or the width of the concave portion 120 with respect to the pitch.

When the depth of the structure 102 (depth of the concave portion 120) is d', the phase modulation amount is (n−n')×d', hence if the structure satisfies $$(n-1)\times d\times m=(n-n')\times d',$$

the phase modulation amount of the m-th step of the optical element 2 is implemented. By determining the effective refractive index n' and the depth d' for each region, so as to satisfy this condition, an optical element 1 having the function equivalent to the step type optical element 2 is acquired.

FIG. 2A is a graph depicting the relationship between the fill factor of the structure 102 and the effective refractive index when the material of the structure 102 has the refractive index n=1.5. In the case of the pillar-shaped pattern, the effective refractive index monotonically increases as the fill factor increases, which matches with n=1 (the refractive index of air) when the fill factor is 0, and is n=1.5 (the refractive index of the material) when the fill factor is 1.

Figure 2B:
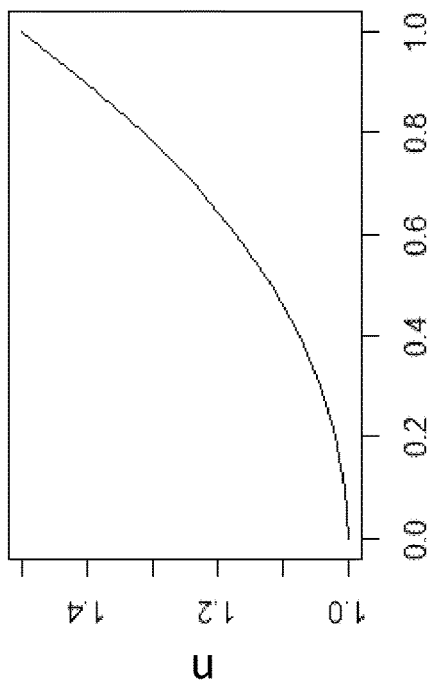

FIG. 2B is a graph depicting a relationship between the fill factor and the structure depth of the optical element 1. As described later, when the structure 102 is processed by dry etching, the etching conditions are set such that the structure depth changes in accordance with the fill factor. Then the depth monotonically decreases as the fill factor increases, as indicated in FIG. 2B.

Figure 2C:
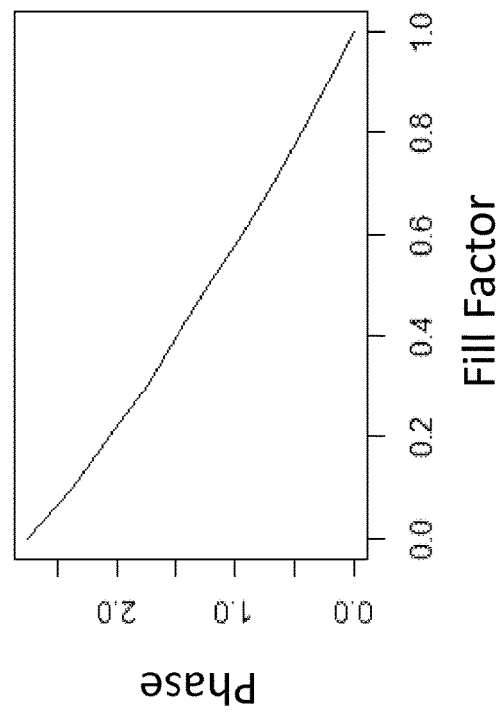

The effective refractive index n' and the depth d are determined depending on the fill factor, and the phase modulation amount is determined in accordance with the above expression. FIG. 2C is a graph depicting the relationship between the phase modulation amount and the fill factor. In this way, a phase modulation type diffractive optical element having a desired phase modulation amount can be fabricated simply by performing dry etching with changing the fill factor of the structure 102 for each region.

In the above description, the structure 102 has a structure where the pillar-shaped convex portion 110 is repeatedly formed, but may have a structure where a hole-shaped concave portion is repeatedly formed. In the case where the structure 102 is formed by the hole-shaped concave portions, the effective refractive index decreases as the fill factor decreases, unlike the relationship of the fill factor and the effective refractive index in FIG. 2A, but the fill factor can be determined in accordance with the modulation amount in the same manner as the above description. The fill factor in the case of using the hole-shaped concave portions is defined by the width of the concave portion with respect to the pitch of the concave portions.

The structure 102 may include both the pillar-shaped convex portions and the hole-shaped concave portions. For example, the structure 102 may be formed by either the convex portions or the concave portions, or both the convex portions and the concave portions depending on the phase modulation amount.

Manufacturing Method

Figure 3A:
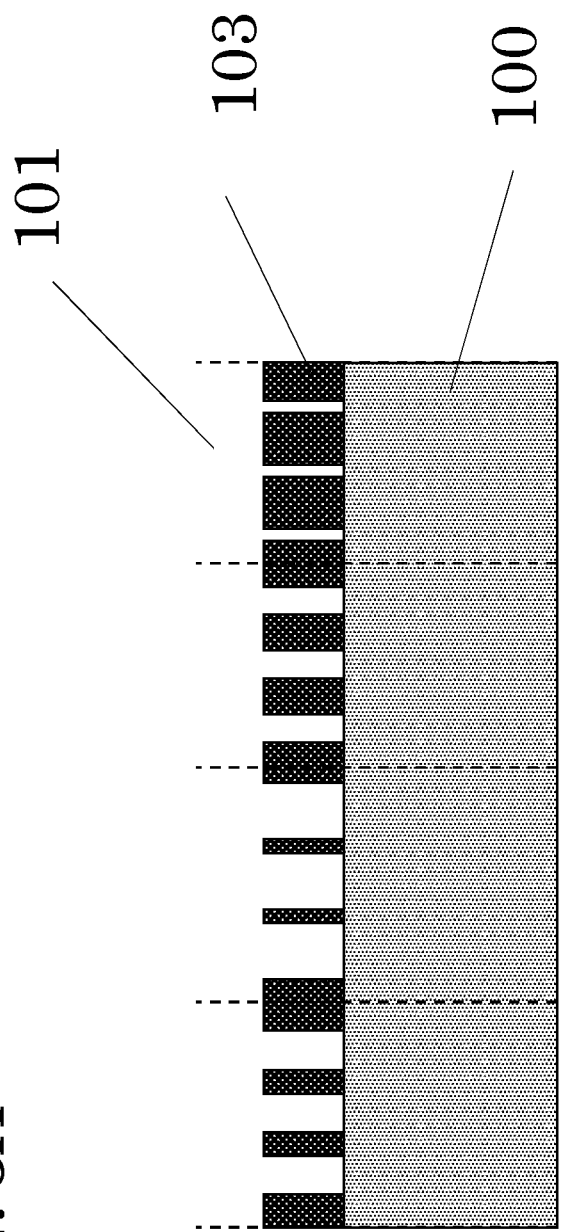
FIG. 3A and FIG. 3B are process diagrams of the diffractive optical element according to Embodiment 1.
Figure 3B:
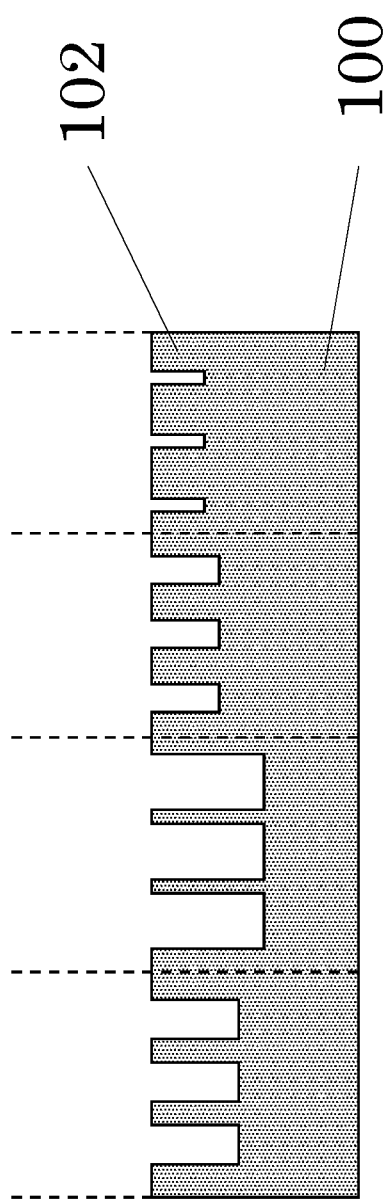

FIG. 3A and FIG. 3B illustrate a method of forming the phase modulation type diffractive optical element 1, which is an example of an embodiment of the present disclosure. In this example, the optical element 1 includes four phase modulation regions 101, but a number of phase modulation regions 101 of the optical element 1 is not especially limited.

Substrate

For the substrate 100, any transparent substrate that is transparent to light (electromagnetic waves) having a target wavelength can be used. For example, the substrate 100 for a visible light can be selected from quartz, glass, transparent resin and the like. The substrate 100 for the infrared light can be selected from Si, GaN, GaAs and the like.

In the description herein below, the structure 102 is formed using the substrate 100, but the present invention is not limited to this, and the structure 102 may be formed by a transparent material formed on the substrate 100.

Resist Patterning

As illustrated in FIG. 3A, a resist film is coated on the surface of the substrate 100, and resist patterns 103 are formed on a region 101 where the structure 102 is formed using photolithography, electron beam drawing or the like. At this time, the fill factor of the resist patterns 103 has a different value depending on the phase modulation region 101, and is set to a desired phase modulation amount according to FIG. 2C.

Dry Etching

The concave/convex portions of the structure 102 is formed by performing dry etching using the resist pattern 103 as a mask. For the dry etching, a standard etching apparatus can be used, such as a reactive ion etching apparatus and a reactive ion beam etching apparatus.

For the etching gas, any gas that can etch the substrate 100 is selected. If the substrate 100 is glass, CF gas such as $CF_4$, $CHF_3$, $C_3F_8$, or $C_4F_8$ can be selected. If the substrate 100 is a resin, $O_2$ gas can be selected in addition to the CF gas. If the substrate 100 is GaAs or GaN, a chlorine gas such as $Cl_2$, $BCL_3$, or $SiCl_4$ can be selected. If the substrate 100 is Si, the chlorine gas can be selected in addition to $SF_6$ and the CF gas. These gases can be used alone or a plurality of types of gas can be mixed. Ar, $O_2$ or $N_2$ may be added to the etching gas.

Here it is desirable to set the etching conditions such that the micro loading phenomenon, where the depth of etching changes depending on the fill factor, appears remarkably. Alternatively or additionally, the conditions may be set such that the side walls of concave/convex portions of the structure 102 are tapered during etching, thereby achieving different depths since the etching process stops sequentially from the portions of the structure having a larger fill factor. By this etching, the depth of the structure 102 (depth of concave portions 120 and height of convex portions 110) can be set to a value in accordance with the fill factor.

Surface Processing

In order to further increase the phase change amount, the surface of the structure 102 may be constituted by a material that is different from the substrate material, by performing surface treatment (e.g. oxidation) on the formed structure 102. For example, after forming the structure 102, using Si, on the substrate 100 for infrared light, the thermal oxidation treatment is performed, thereby the surface of the structure 102 is changed to $SiO_2$ of which refractive index is smaller than Si, and the effective refractive index can be further decreased.

Advantageous Effect

According to this embodiment, the depth of the structure 102 can be determined in accordance with the fill factor of the structure 102. The relationship between the fill factor and the depth (FIG. 2B) and the relationship between the fill factor and the effective refractive index (FIG. 2A) can be known in advance, therefore the relationship between the fill factor and the phase modulation amount (FIG. 2C) can also be determined in advance. Hence, by a single etching step, the diffractive optical element 1 having a desired phase modulation amount can be produced merely by generating the structure 102 of which the fill factor is in accordance with the phase modulation amount that is set for each region type.

Embodiment 1

For a phase modulation type diffractive optical element to convert the profile of a laser having wavelength of 514.5 nm, an example of forming the structure 102 on an 8 inch quartz substrate 100 will be described.

Structure

Figure 4:
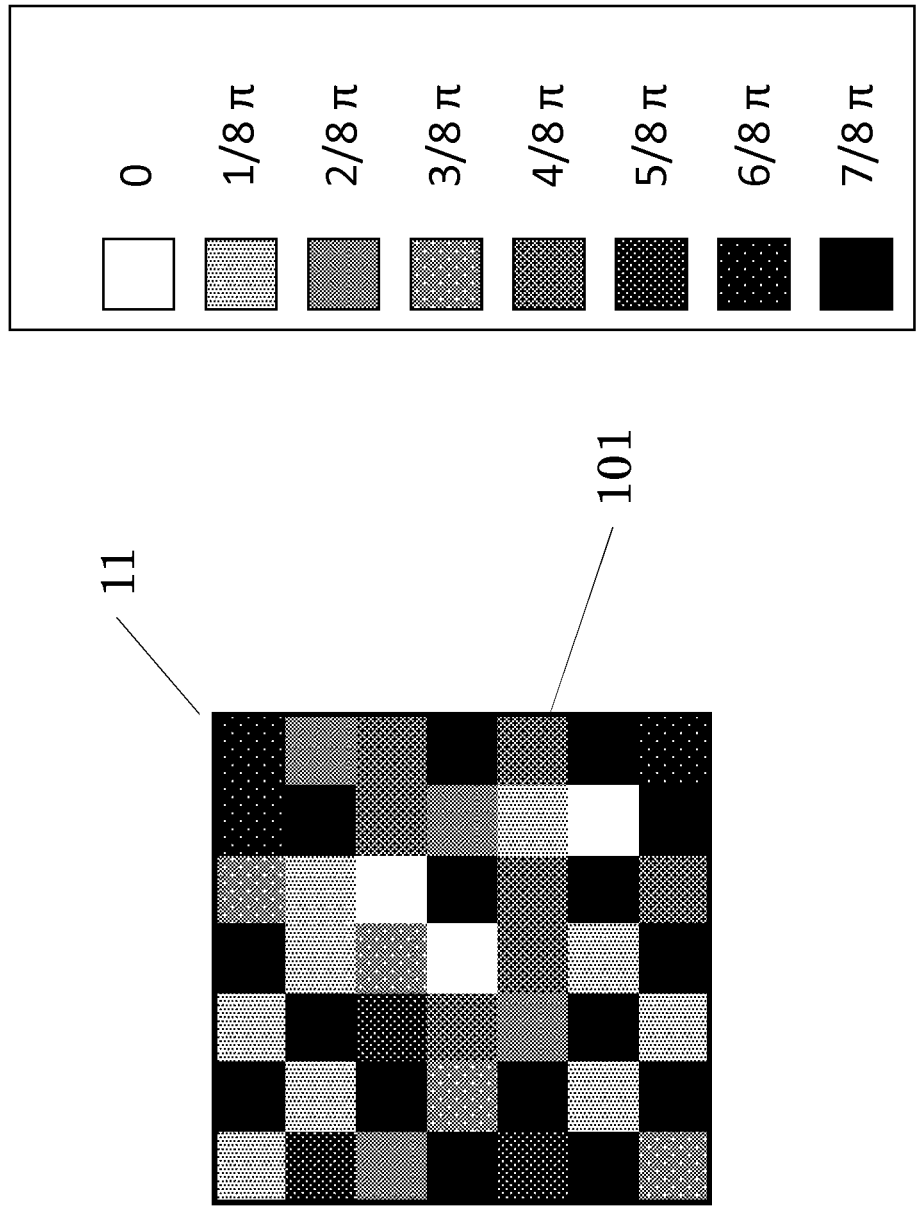
FIG. 4 is a top view of the diffractive optical element according to Embodiment 1.

FIG. 4 is a schematic top view depicting the configuration of the phase modulation type diffractive optical element 11 for converting the laser profile. In the optical element 11, each phase modulation region 101 having a respective phase modulation amount is randomly arranged on a 1.0 mm thick quartz substrate 100. In this embodiment, each phase modulation region 101 is a rectangular region, and a plurality of phase modulation regions 101 are arranged in a two-dimensional lattice. In this embodiment, eight types of phase modulation regions, of which phase modulation amount changes sequentially by $\pi/8$, but a number of types of the phase modulation regions is not especially limited.

Each phase modulation region 101 is formed with the structure 102 which has a 200 nm pitch cycle. The fill factor and the depth of the structure 102 are determined so that the predetermined phase modulation amount is implemented. In concrete terms, the fill factor is determined based on the phase modulation amount in accordance with the relationship in FIG. 2C, and the depth is determined based on the fill factor in accordance with the relationship in FIG. 2B.

Pattern Formation

A resist film is coated on the quartz substrate 100, and resist patterns 103 are formed in the region 101 where the structure 102 is formed (FIG. 3A). Patterning is performed so that the resist patterns 103 are 200 nm pitch pillar-shaped patterns, and the fill factor is different for each phase modulation region 101. The portion where the resist pattern 103 is formed becomes a convex portion 110, and the portion where the resist pattern is not formed becomes a concave portion 120. In Embodiment 1, the width of the resist pattern 103 is wider and the space between the resist patterns 103 is smaller as the fill factor of the structure 102 to be formed is larger.

An area which is not covered by the resist patterns 103 is dry etched, so as to form the pillar structure 102 in the quartz substrate 100 (FIG. 3B). For the dry etching, a parallel plate type RIE etching apparatus is used. Etching is performed under the conditions of: RF power 100 W, process pressure 1 Pa and $CHF_3$ gas 40 sccm. Here in a region of which fill factor is large, the micro loading phenomena is generated, by which the aspect ratio of the etching shape becomes large and the etching rate becomes slower than a region of which fill factor is small and the aspect ratio is small. In other words, because of the micro loading phenomena, the etching rate become slower as the interval between the resist patterns 103 is smaller. This means that the processed depth changes depending on the value of the fill factor, and the structure 102 which has regions of which fill factors and depth are different from each other can be formed.

In the structure 102 formed in Embodiment 1, the side walls of each convex portion 110 are approximately vertical with respect to the surface of the substrate 100. The depth in the structure 102 of Embodiment 1 monotonically increases as the fill factor is smaller, that is, as the width of the concave portion 120 of the concave/convex portions is larger.

By the above mentioned processing steps, the quartz phase modulation type diffractive optical element, which converts the profile of the laser, can be fabricated.

Embodiment 2

To use the diffractive lens of an infrared laser having wavelength of 1.55 μm, an example of forming the structure on an eight inch Si substrate will be described.

Structure

Figure 5:
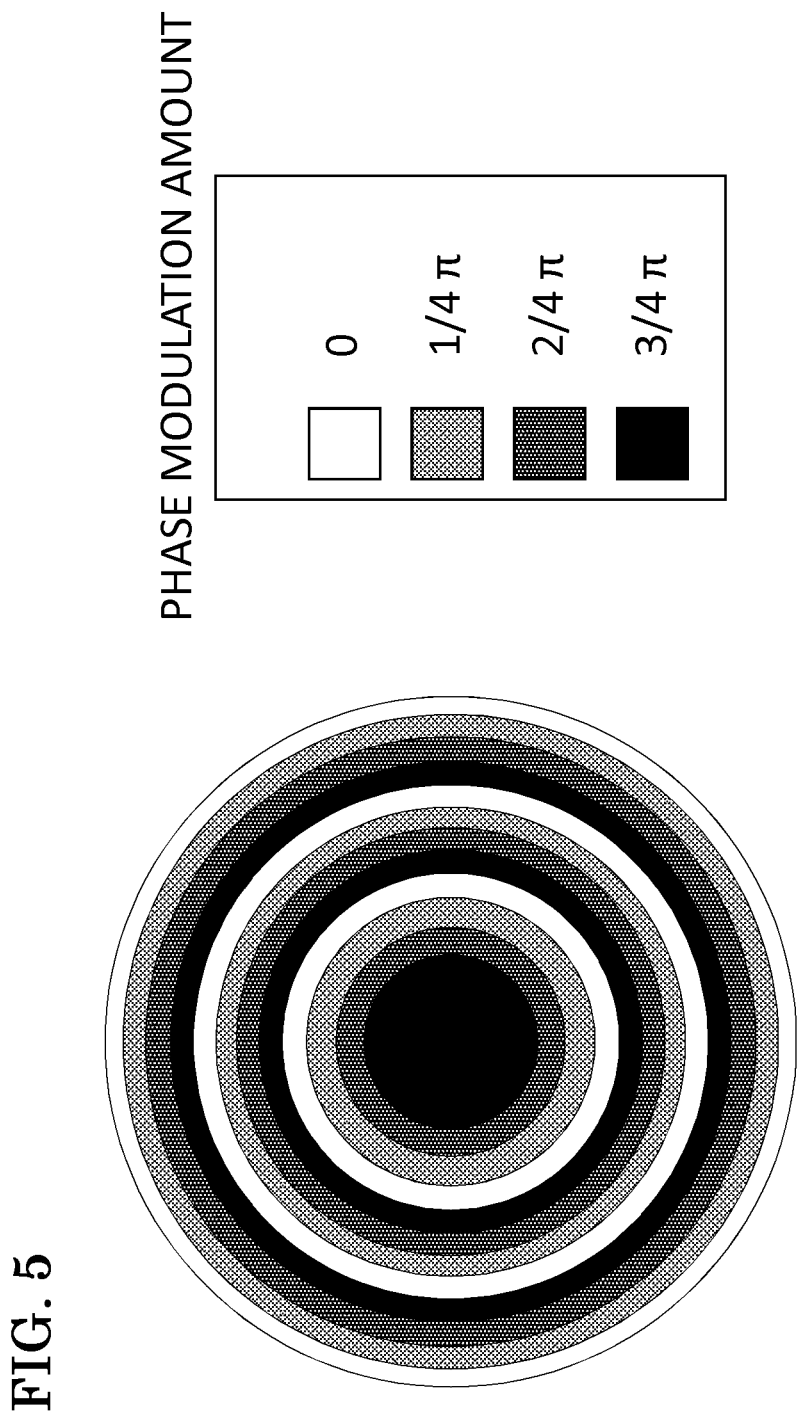
FIG. 5 is a top view of the diffractive optical element according to Embodiment 2.

FIG. 5 is a schematic top view depicting a configuration of the diffractive lens for an infrared laser. Each circular phase modulation region 101 having a respective different phase modulation amount is arranged concentrically on the 0.725 mm thick Si substrate 100, and each phase modulation region 101 is formed with the structure 102 which has a 400 nm pitch cycle. Further, in this structure 102, the surface of the structure is covered by thermally oxidized Si, so as to increase the change amount of the effective refractive index.

Pattern Formation

Figure 6A:
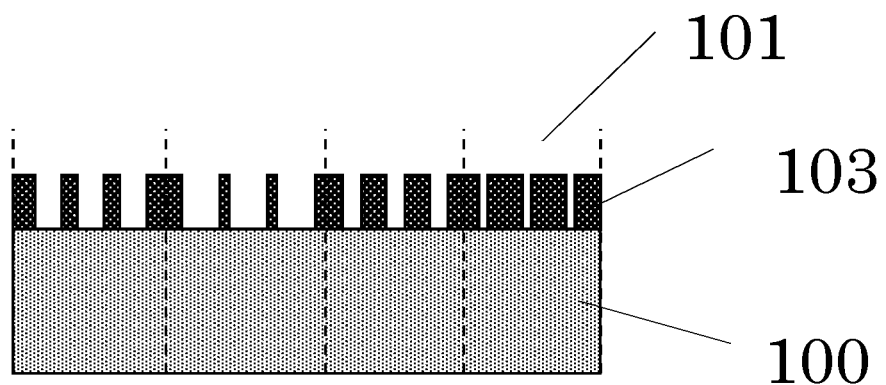
FIG. 6A to FIG. 6C are process diagrams of the diffractive optical element according to Embodiment 2.

A resist film is coated on the Si substrate 100, and resist patterns 103 are formed in the region 101 where the structure 102 is formed (FIG. 6A). Patterning is performed so that the resist patterns 103 include mixed patterns of 400 nm pitch pillar-shaped and hole-shaped patterns, and the fill factor is different for each phase modulation region 101.

Figure 6B:
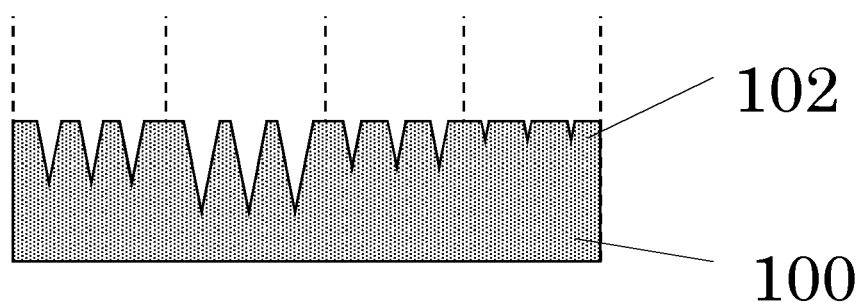

An area which is not covered by the resist patterns 103 is dry-etched, so as to form the structure 102 on the Si substrate 100 (FIG. 6B). For the dry etching, an etching apparatus, which includes an inductively-coupled plasma source, is used. The RF power on the plasma source side is 1500 W, the RF power applied to the substrate is 50 W, and the process pressure is 13 Pa, and the gas to be used is a mixed gas of $SF_6/C_4F_8/O_2$, and the flow rate thereof is 100/15/5 sccm.

In Embodiment 2, etching conditions for etching the substrate in tapered shapes are used. Since the substrate is etched in tapered shapes, the width of the base of each opening becomes approximately 0, and etching stops sequentially from a region of which fill factor is larger as the etching progresses. In a region in which the width of each opening is large, etching still continues since the width of the base is large, and etching stops when the width of the base becomes approximately 0. This means that the processing depth changes depending on the value of the fill factor, and the structure 102, which has regions of which fill factors and depth are different from each other, can be formed.

Figure 6C:
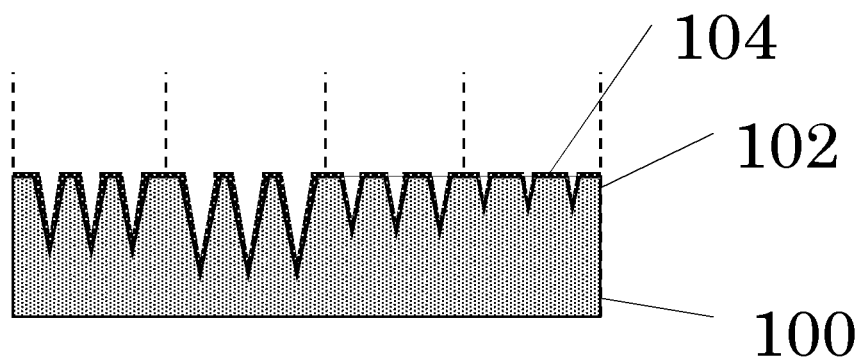

The Si substrate 100 on which the structure 102 is formed is thermally oxidized, so that the 50 nm surface of the structure 102 is changed to the oxidized region 104 comprised of thermally oxidized silicon (FIG. 6C). The ratio of the region changed to thermally oxidized silicon, with respect to the structure 102, is small in a region of which fill factor is large, but most of the silicon structure 102 changes to thermally oxidized silicon in a region of which fill factor is small. As a result, the ratio of the thermally oxidized silicon changes depending on the value of the fill factor, and the modulation amount of the effective refractive index also changes accordingly.

The structure 102 formed in Embodiment 2 has tapered shapes. In other words, the convex and concave portions of the structure 102 have side walls which are inclined with respect to the surface of the substrate 100. The depth of the structure 102 of Embodiment 2 monotonically increases as the fill factor is smaller, that is, as the width of the concave portion 120 of the concave/convex portion is larger.

By the above mentioned processing steps, a diffractive lens for an infrared laser can be fabricated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-218194, filed on Nov. 21, 2018, which is hereby incorporated by reference herein in its entirety.

What is claimed is:

1. A diffractive optical element having, on a surface of a transparent substrate, a plurality of types of regions which provide different phase modulation to an incident light,
   wherein each of the regions has a microstructure formed with concave and convex portions of which sizes are smaller than the wavelength of the incident light, and
   wherein in the microstructure, a fill factor and a depth of the concave portion are different for each type of region.

2. The diffractive optical element according to claim 1, wherein the microstructure includes:
   a first region having a first fill factor and a first concave portion having a first depth; and
   a second region having a second fill factor smaller than the first fill factor and a second concave portion having a second depth larger than the first depth.

3. The diffractive optical element according to claim 1, wherein the microstructure includes:
   a first region having a first concave portion having a first width and a first depth; and
   a second region having a second concave portion having a second width smaller than the first width and a second depth larger than the first depth.

4. The diffractive optical element according to claim 1, wherein the microstructure is formed with a cyclic structure of which pitch is not more than the wavelength of the incident light.

5. The diffractive optical element according to claim 1, wherein the concave and convex portions have side walls which are approximately vertical with respect to the surface of the transparent substrate.

6. The diffractive optical element according to claim 1, wherein the concave and convex portions have side walls which are inclined with respect to the surface of the transparent substrate.

7. The diffractive optical element according to claim 1, wherein a surface of the microstructure is formed with a material which is different from a material of the transparent substrate.

8. The diffractive optical element according to claim 1, wherein a region includes a plurality of rectangular regions which are arranged in a two-dimensional lattice.

9. The diffractive optical element according to claim 1, wherein a region includes a plurality of concentric circular regions.

10. A method of producing a diffractive optical element, comprising:
    a step of forming resist patterns having different cycles on a surface of a transparent substrate; and
    a step of forming a microstructure formed with concave and convex portions by performing dry etching using the resist patterns as a mask,
    wherein in the step of forming the microstructure, the microstructure including a first region having a first fill factor and a first concave portion having a first depth, and a second region having a second fill factor smaller than the first fill factor and a second concave portion having a second depth larger than the first depth, is formed by changing an etching rate in accordance with an interval of the resist patterns.

11. The method of producing the diffractive optical element according to claim 10, wherein in the step of forming the microstructure, the dry etching is performed under etching conditions in which the etching rate is slower as the interval of the resist patterns is smaller.

12. The method of producing the diffractive optical element according to claim 10, wherein the first concave portion has a first width and the second concave portion has a second width smaller than the first width.

13. The method of producing the diffractive optical element according to claim 10, wherein in the step of forming the microstructure, the dry etching is performed under etching conditions for etching the transparent substrate in tapered shapes.

14. The method of producing the diffractive optical element according to claim 10, further comprising a step of performing thermal oxidation processing to the transparent substrate on which the microstructure is formed.

15. The method of producing the diffractive optical element according to claim 10, wherein in the step of forming the resist patterns, resist patterns having a predetermined cycle are formed for each of a plurality of rectangular regions which are arrayed in a two-dimensional lattice on the surface of the transparent substrate.

16. The method of producing the diffractive optical element according to claim 10, wherein in the step of forming the resist pattern, resist patterns having a predetermined cycle are formed for each of a plurality of concentric circular regions on the surface of the transparent substrate.

17. A method of producing a diffractive optical element, comprising:
   a step of forming resist patterns having different cycles on a surface of a transparent substrate; and
   a step of forming a microstructure formed with concave and convex portions by performing dry etching using the resist patterns as a mask,
   wherein in the step of forming a microstructure, the microstructure including a first region having a first fill factor and a first concave portion having a first depth, and a second region having a second fill factor smaller than the first fill factor and a second concave portion having a second depth larger than the first depth, is formed by performing dry etching under etching conditions for etching the transparent substrate in tapered shapes.

18. The method of producing the diffractive optical element according to claim 17, wherein the first concave portion has a first width and the second concave portion has a second width smaller than the first width.

19. The method of producing the diffractive optical element according to claim 17, further comprising a step of performing thermal oxidation processing to the transparent substrate on which the microstructure is formed.

* * * * *